United States Patent
Hoglund

[11] Patent Number: 5,901,585
[45] Date of Patent: May 11, 1999

[54] DRUM SUPPORTED BY SUPPORT ROLLERS FOR WASHING FIBRE MATERIAL

[75] Inventor: Ronny Hoglund, Mellquistvagen, Sweden

[73] Assignee: Kvaerner Pulping AB, Karlstad, Sweden

[21] Appl. No.: 08/973,287

[22] PCT Filed: Jun. 5, 1996

[86] PCT No.: PCT/SE96/00738

§ 371 Date: May 12, 1998

§ 102(e) Date: May 12, 1998

[87] PCT Pub. No.: WO96/41916

PCT Pub. Date: Dec. 27, 1996

[30] Foreign Application Priority Data

Jun. 12, 1995 [SE] Sweden ............................. 9502118-4

[51] Int. Cl.⁶ .................................................. D21C 1/02
[52] U.S. Cl. .............................. 68/43; 68/181 R; 162/60; 162/329; 162/380; 210/404
[58] Field of Search .................... 68/43, 181 R; 162/60, 317, 328, 329, 380; 210/402, 404

[56] References Cited

U.S. PATENT DOCUMENTS

| | | | |
|---|---|---|---|
| 2,658,428 | 11/1953 | Goldsmith | 162/329 |
| 3,174,624 | 3/1965 | Putnam | 210/402 |
| 3,403,786 | 10/1968 | Luthi | 210/404 X |
| 4,827,741 | 5/1989 | Luthi | 68/43 |
| 4,952,314 | 8/1990 | Henricson et al. | 68/181 R X |
| 5,266,168 | 11/1993 | Suica | 162/60 X |
| 5,460,019 | 10/1995 | Ojala et al. | 68/43 |
| 5,722,264 | 3/1998 | Antkowiak | 68/43 |

FOREIGN PATENT DOCUMENTS 2390553  1/1979  France ................................ 210/402

*Primary Examiner*—Philip R. Coe
*Attorney, Agent, or Firm*—Seed and Perry LLP

[57] ABSTRACT

Apparatus for treating pulp, comprising a stand (1); a rotatably mounted drum (3); feeding and discharging members (6, 8) for the pulp; a wall member (2) which surrounds the jacket (40) of the drum in order to delimit therebetween a material space (5) with which the feeding member communicates via an inlet (7), which material space includes two treatment zones (24, 25); a delivery member (26) for delivering liquid to the treatment space via the wall member; a press member (22, 23) arranged downstream of each delivery member in order to exert a press force against the pulp; a collecting chamber (18, 19) inside the drum in connection with each treatment zone and press member for receiving liquid which is pressed through the jacket. According to the invention, the drum is supported by two support rollers (12, 13) which extend through the drum on either side of its vertical center plane and are in contact with the inner side of the drum, the support rollers being rotatably mounted on the stand (1). In addition, end walls (16) are arranged in a stationary manner at the axially opposite ends of the drum in order to close off the collecting chambers (18, 19) laterally.

9 Claims, 3 Drawing Sheets

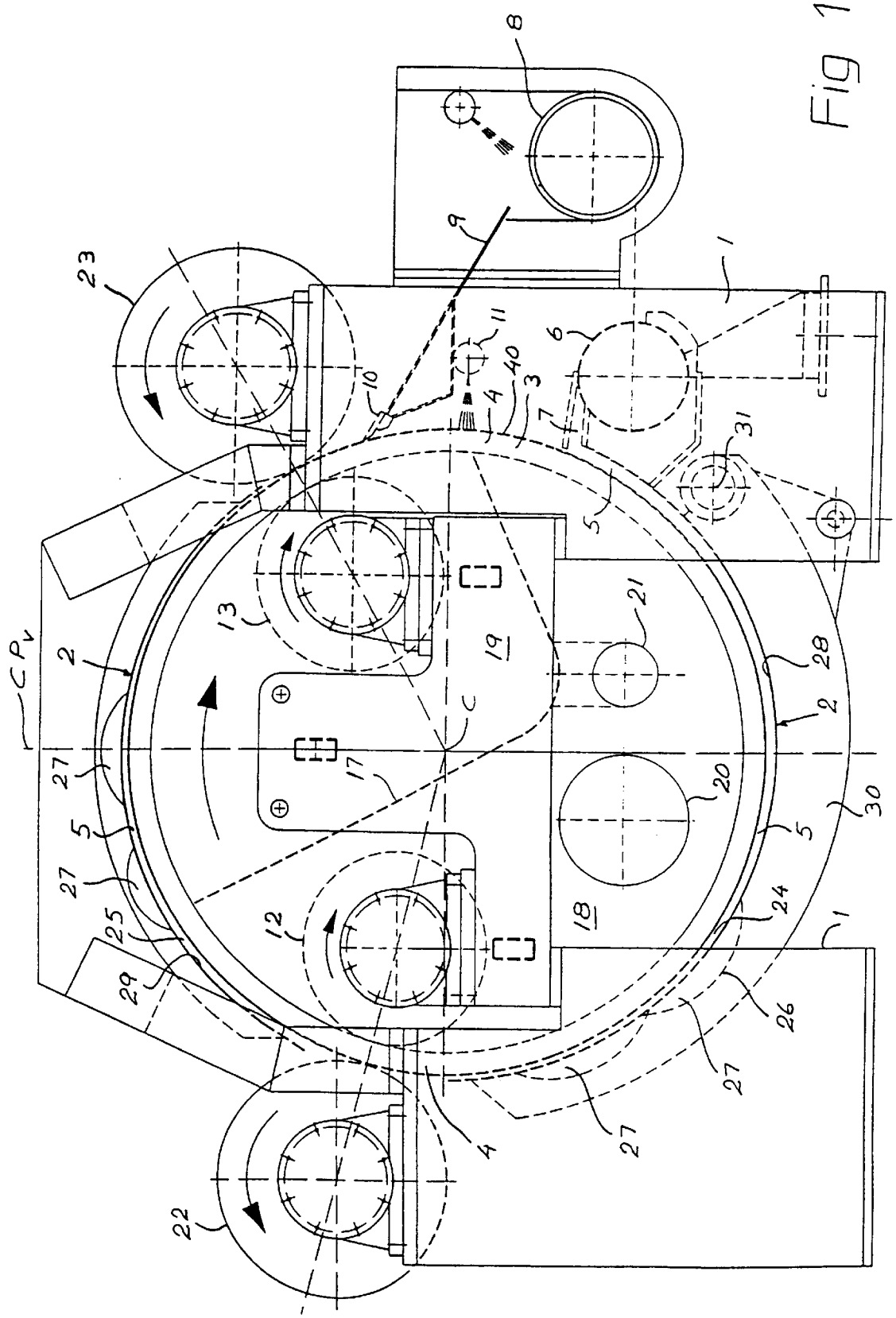

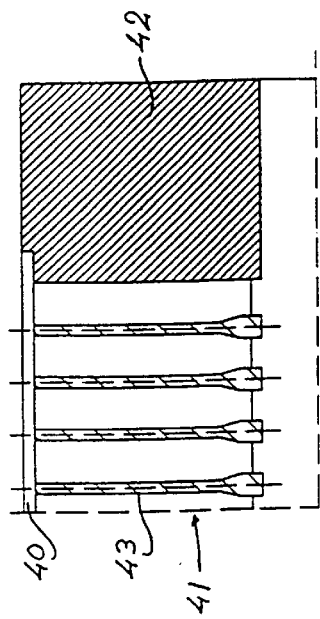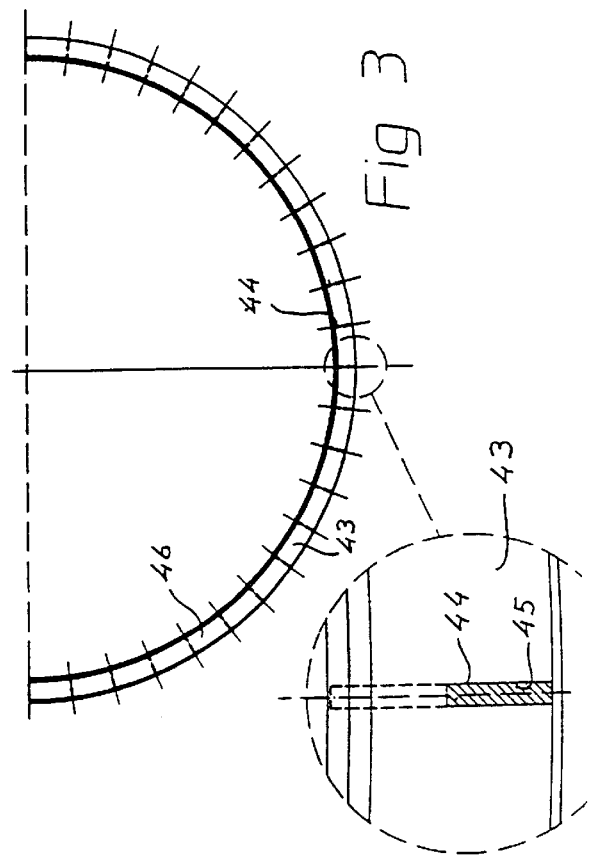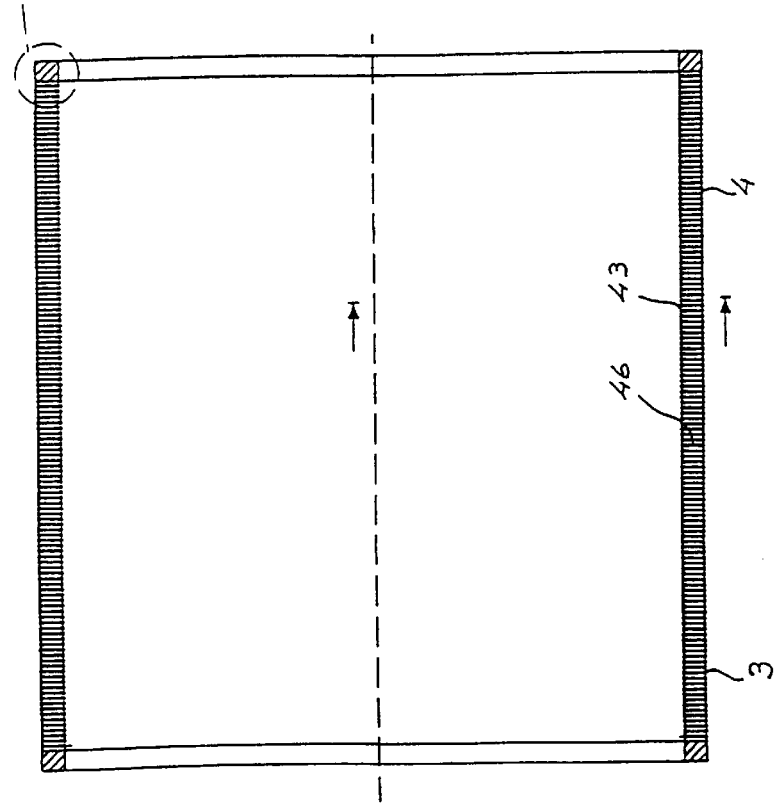

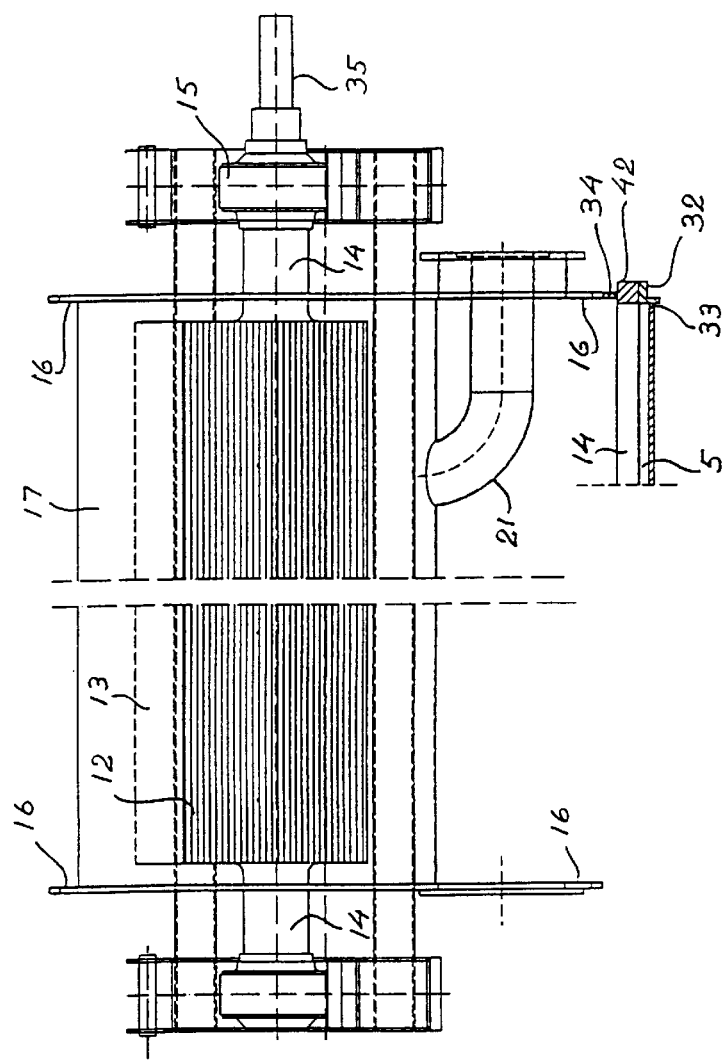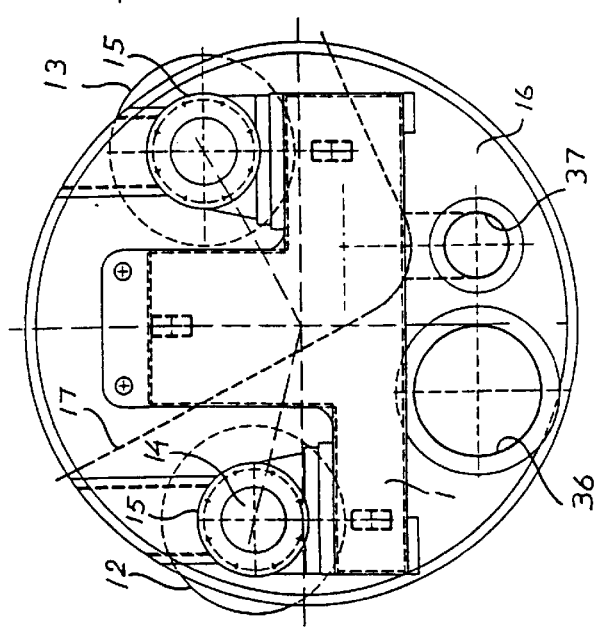

DRUM SUPPORTED BY SUPPORT ROLLERS FOR WASHING FIBRE MATERIAL

The present invention relates to an apparatus for treating a liquid-containing fibre material, the said apparatus comprising a stand; a rotatably mounted drum with a cylindrical liquid-permeable jacket; feeding and discharging members for feeding and discharging, respectively, the fibre material; a wall member which surrounds at least a part of the jacket in order to delimit between itself and the jacket a material space with which the feeding member communicates via an inlet, which material space includes at least one treatment zone; a delivery member arranged on the outside of the wall member within the said treatment zone for delivering treatment liquid to the treatment space via openings in the wall member; a press member arranged downstream of each delivery member in order to exert a press force against the fibre material; and a collecting chamber arranged inside the drum in connection with each treatment zone and press member for receiving liquid which is pressed through the jacket.

Conventional wash presses of the type mentioned above have their drums centrally mounted with the aid of spindles or the like. In such a construction it is not possible to provide, on the one hand, fixed internal partition walls for forming separate collecting chambers for different filtrates, and, on the other hand, internal axial support rollers which have, among other things, a supporting function.

The object of the invention is to make available an improved apparatus which is used principally, but not exclusively, for washing and pressing of principally, but not exclusively, pulp in several stages, where the filtrate from each stage can be removed separately from the drum by virtue of the fact that the apparatus has a drum which is simplified in constructional terms and which is free from a central bearing shaft and radial support elements between this shaft and the drum jacket.

The apparatus according to the invention is characterized in that the drum is supported by two or more support rollers, which two support rollers extend through the drum on either side of the vertical centre plane of the drum and are in contact with the inner side of the cylindrical body of the drum, the support rollers being rotatably mounted on the stand; and in that closure members are arranged in a stationary manner at the axially opposite ends of the drum in order to close off the said collecting chamber or chambers laterally.

The invention will be explained in greater detail with reference to the drawings.

FIG. 1 is an end view of an apparatus according to a preferred embodiment of the invention.

FIG. 2 is a cross-sectional view of a drum belonging to the apparatus according to FIG. 1.

FIG. 3 is a cross-sectional view of a half part of the drum which is shown in FIG. 2.

FIGS. 4 and 5 are enlarged details of the drum according to FIGS. 2 and 3.

FIG. 6 is an end view of the drum and its support rollers belonging to the apparatus according to FIG. 1.

FIG. 7 is a side view of the drum and the support rollers according to FIG. 6.

The wash apparatus shown diagrammatically in FIG. 1 includes a stand 1, a wall member 2 and a drum 3 which has a cylindrical body 4 and is open to both sides. The drum 3 does not therefore itself have end walls. The wall member 2, which has a curved shape, and the cylindrical body 4 of the drum delimit between themselves a material space 5 for the liquid-containing fibre material which is to be treated. As can be seen more clearly from FIGS. 2 to 5, the cylindrical body 4 of the drum includes a jacket 40 in the form of a screen plate and a support structure 41, which is surrounded by the screen plate 40. The support structure 41 includes two opposite end rings 42 and a plurality of plane rings 43 situated between them, and also a plurality of straight flat-bars 44 which extend between the end rings 42. The flat-bars 44 and the plane rings 43 have opposing radial recesses 45 in which they receive one another by their full radial dimension in order to form rectangular compartments 46, which are open only in the direction towards the centre of the drum 3 so that liquid which is pressed through the perforations (not shown in FIG. 4) in the screen plate 40 passes through the radially inwardly directed compartments 46. In this way, liquid is prevented from flowing in the circumferential direction along the inside of the screen plate 40 when the drum is rotating.

A feeding member 6, which has the form of a distributor screw, is arranged along one side of the apparatus and communicates with the material space 5 via an inlet 7. A discharging member 8, which has the form of a discharger and scraper screw, is arranged along the same side of the apparatus as the feeding member 6 in order to receive the treated fibre material which is leaving the material space 5 via an inclined board 9. The board 9 is provided with a scraper device 10 which interacts with the jacket 40 in order to loosen the fibre material from the jacket. Upstream of the feeding member 6, the drum passes a free space where spray devices 11 are arranged so as to rinse the exposed jacket 40 clean during the drum's rotation about its horizontal centre line C.

The drum 3 does not have a supporting central shaft or radial connections between such a central shaft and the cylindrical body 4. Instead, the drum 3 is supported freely, i.e. without any fixed mechanical connection, by two support rollers 12, 13 which extend through the drum 3 parallel to its centre line C and on either side of the vertical centre plane $CP_v$ of the drum, the inner side of the cylindrical body 4 of the drum being in contact with the cylindrical surfaces of the support rollers 12, 13. As can be seen more clearly from FIGS. 6 and 7, the support rollers 12, 13 have axle spindles 14 for their rotatable mounting in bearing housings 15 which are mounted on the stand 1. At least one support roller 12, 13 can be arranged to be driven via a drive shaft 35 of a motor (not shown) in order in turn to rotate the drum in the direction indicated by an arrow (see FIG. 1). The drum 3 can alternatively be driven by a separate drive, which is separate from the rotatably mounted support rollers 12, 13, for example via a gear ring which is arranged at a suitable location on the drum 3, the rotating movement of the drum thus being transmitted to the support rollers 12, 13 for joint rotation together with these.

The ends of the drum are closed off by two closure members 16 which, in the embodiment shown, consist of elements in the form of circular discs which are rigidly connected to the stand 1 in order to form end walls which close off the ends of the drum 3 and which are stationary in relation to the drum 3. The end walls 16 are surrounded by the cylindrical body 4 of the drum, more specifically its end rings 42, and sealing rings 34 are arranged between the periphery of the end walls and the inner side of the end rings 42 in order to prevent leakage of liquid therebetween.

A partition wall 17 extends between the end walls 16 and is rigidly mounted on these in order to divide the drum 3 into a first collecting chamber 18 and a second collecting chamber 19, which chambers each contain one of the said two support rollers 12, 13. The partition wall 17 expediently has an angled shape, as is shown in FIG. 1. An outlet pipe 20 is connected to the first collecting chamber 18 via an opening 36 in the one end wall 16. Likewise, an outlet pipe 21 is connected to the second collecting chamber 19 via an opening in the partition wall 17, which outlet pipe 21 extends through the first collecting chamber 18 and a hole 37 in the other end wall 16.

In the area of each support roller 12, 13 there is an outer press member 22, 23 which is arranged to act directly or indirectly against the fibre material so that liquid is pressed through the drum 3 in order to be collected in the first collecting chamber 18 or the second collecting chamber 19, respectively. In the embodiment which is shown, the press members 22, 23 consist of rotatably mounted press rollers which are parallel with the support rollers 12, 13.

The material space 5 includes a first treatment zone 24, and a second treatment zone 25 situated downstream of the latter, these treatment zones 24, 25 being concluded by pressing events due to the action of the press members 22, 23.

Delivery members 26 for delivering wash liquid to the material space 5 are arranged on the outside of the wall member 2 within each treatment zone 24, 25. Each delivery member 26 includes a distribution channel 27 which extends across the whole wall member 2, and a plurality of small continuous openings in the wall member 2 which are arranged in a plurality of rows along the distribution channel 27 so that liquid is distributed uniformly to all the fibre material which is passing with the aid of the rotating drum 3. The said openings are expediently formed by nozzles (not shown) mounted in the wall member 2.

In the embodiment which is shown, the wall member 2 includes a curved, lower plate 28 or bottom plate, and a curved, upper plate 29 or top plate. The bottom plate 28 forms a trough and extends from the inlet 7 and round the drum 3 up to a point which is located near the first press roller 22, so that the fibre material is exposed just before it reaches the press roller 22. The top plate 29 extends from a point which is located after and near the first press roller 22 up to a point which is located near the second press roller 23, so that the fibre material is exposed just before it reaches the press roller 23. The distance of the bottom and top plates 28, 29 from the drum decreases in the direction of rotation of the drum, so that the material space 5 acquires a converging shape within each treatment zone 24, 25. The essentially semicylindrical bottom plate 28 is supported by two or more arcuate and mutually parallel adjustment arms 30 which surround a relatively large part of the bottom plate 28. Each adjustment arm 30 is mounted rotatably, by its end located nearest the inlet 7, on the stand 1 about a horizontal shaft 31, the rotation being generated with the aid of an appropriate operating device, for example a hydraulic cylinder (not shown). With the aid of these adjustment arms 30, the position of the bottom plate 28 in relation to the drum 3 can thus be regulated in such a way that the degree of convergence of the material space 5 can be adjusted as required. Similar adjustment arms can also be arranged for the top plate 29.

As can be seen from FIG. 7, the material space 5 is closed off laterally by rings 32 which surround the cylindrical body 4 of the drum radially outside the position of the end walls 16 and which are rigidly mounted on the end rings 42 of the drum. In order to prevent leakage of liquid, the side edges of the bottom and top plates 28, 29, which side edges are parallel with each other and face away from each other, are provided with gaskets 33 which cooperate in a sealing manner with radial surfaces of the said rings 32.

The two said press rollers 22, 23 form, together with the cylindrical body 4 of the drum, a nip through which the layer of fibre material passes so that liquid is pressed out of the latter and through the screen plate 40 in order to be collected in the collecting chambers 18, 19. The axle of each press roller 22, 23 can be displaced in parallel with the axle of the support roller 12, 13 for regulating the size of the nip and thus the press force of the press roller against the layer of fibre material and the stable cylindrical body 4. The support rollers 12, 13 function at the same time as counterstays so that the drum is stabilized and is prevented from becoming deformed by the pressure which is applied by the press rollers 22, 23.

The press member can alternatively consist of a press shoe or the like with a slide surface or movable slide track which acts directly against the layer of fibre material. The press member can also act against a press plate or press flap which covers the layer of fibre material so that liquid is pressed out of the fibre material. Such a press plate or press flap can be mounted on the said wall member 2. An apparatus with such press plates or press flaps is normally referred to as a press filter.

If so desired, additional rotatably mounted rollers or cylinders with a bearing or supporting function can be arranged inside the drum in order to bear against the inner side of the drum in the same way as the two support rollers 12, 13.

The apparatus which has been described and has been shown constitutes, in other words, a multi-stage wash press with separate filtrate extractions.

The present invention thus permits the provision, on the one hand, of fixed internal partition walls 17 for forming separate collecting chambers 18, 19 for different filtrates, and, on the other hand, of internal axial support rollers 12, 13 with, among other things, a supporting function. By these means it is possible to simplify the supporting structure 41 of the drum.

I claim:

1. Apparatus for treating a liquid-containing fiber material, the apparatus comprising a stand; a rotatably mounted drum with a cylindrical liquid-permeable jacket; feeding and discharging members for feeding and discharging, respectively, the fiber material; a wall member which surrounds at least a part of the jacket to delimit between itself and the jacket a material space with which the feeding member communicates via an inlet, the material space includes a treatment zone; a delivery member arranged on the outside of the wall member within the said treatment zone for delivering treatment liquid to the material space via openings in the wall member; a press member arranged downstream of the delivery member in order to exert a press force against the fiber material; and a collecting chamber arranged inside the drum in connection with the treatment zone and press member for receiving liquid which is pressed through the jacket, wherein the drum is supported by at least two support rollers which extend through the drum on opposing sides of a vertical center plane of the drum and are in contact with the inner side of the cylindrical body of the drum, the support rollers being rotatably mounted on the stand; and in that closure members are arranged in a stationary manner at the axially opposite ends of the drum to close off the collecting chamber laterally.

2. Apparatus according to claim 1 wherein the closure members are rigidly mounted on the stand.

3. Apparatus according to claim 1 or 2 wherein the support rollers are arranged to extend through the closure members.

4. Apparatus according to claim 1 wherein the collecting chamber has an outlet which extends through the closure member.

5. Apparatus according to claim 1 wherein the closure member includes an element which has the form of a stationary disc.

6. Apparatus according to claim 5 wherein the stationary disc has a circular shape so as to completely close the ends of the drum.

7. Apparatus according to claim 1 wherein the press member consists of a rotatably mounted press roller which is driven in synchrony with the drum and forms a press nip with the jacket of the drum.

8. Apparatus according to claim 1 wherein the collecting chamber is a first collecting chamber, and further comprising a second collecting chamber arranged inside the drum, and a partition wall is arranged inside the drum to radially delimit the first and second collecting chambers from one another, the partition wall being rigidly mounted on mutually facing inner sides of the closure member, the support rollers being delimited from one another by said partition wall.

9. Apparatus according to claim 1 wherein the cylindrical body of the drum includes a support structure surrounded by the jacket and which includes two opposite concentric end rings and a plurality of plane rings arranged therebetween at uniform distances from one another, and a plurality of straight flat-bars rigidly mounted on, and extend between, the end rings, with the flat-bars and the plane rings having opposing radial recesses in which the flat-bars and the plane rings receive one another by their full radial dimension in order to form rectangular compartments open in the direction towards the center of the drum.

* * * * *